United States Patent
Berry et al.

(10) Patent No.: US 9,715,572 B2
(45) Date of Patent: *Jul. 25, 2017

(54) HIERARCHICAL WIRE-PIN CO-OPTIMIZATION

(71) Applicant: International Business Machines Corporation, Armonk, NY (US)

(72) Inventors: Christopher J. Berry, Hudson, NY (US); Ajith Kumar M. Chandrasekaran, Karnataka (IN); Randall J. Darden, Hollister, MO (US); Shyam Ramji, Lagrangeville, NY (US); Sourav Saha, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,186

(22) Filed: Oct. 9, 2015

(65) Prior Publication Data

US 2017/0011163 A1  Jan. 12, 2017

Related U.S. Application Data

(63) Continuation of application No. 14/794,871, filed on Jul. 9, 2015.

(51) Int. Cl.
*G06F 17/00* (2006.01)
*G06F 17/50* (2006.01)

(52) U.S. Cl.
CPC ...... *G06F 17/5081* (2013.01); *G06F 17/5072* (2013.01); *G06F 17/5077* (2013.01); *G06F 2217/84* (2013.01)

(58) Field of Classification Search
USPC ........................................ 716/135
See application file for complete search history.

(56) References Cited

U.S. PATENT DOCUMENTS

| | | | |
|---|---|---|---|
| 2007/0283311 A1* | 12/2007 | Karoubalis | G06F 17/5054 326/38 |
| 2011/0035712 A1* | 2/2011 | Gaugler | G06F 17/5072 716/105 |

(Continued)

OTHER PUBLICATIONS

List of IBM Patents or Patent Applications Treated as Related; (Appendix P), Filed Nov. 10, 2015; 2 pages.

(Continued)

*Primary Examiner* — Mohammed Alam
(74) *Attorney, Agent, or Firm* — Cantor Colburn LLP; Margaret A. McNamara

(57) ABSTRACT

A method and system to perform physical synthesis in a chip design process using hierarchical wire-pin co-optimization are described. The method includes providing boundary conditions to each of a plurality of macros of the chip design from a unit level controller, the boundary conditions including initial pin locations and an indication of which of the pins are movable pins for each of the plurality of macros, performing macro-level physical synthesis at each of the plurality of macros, and providing feedback to the unit level controller based on the macro-level physical synthesis performed at each of the plurality of macros, the feedback including a proposed new location for the movable pins of each of the plurality of blocks. The method also includes performing hierarchical co-optimization at the unit level controller based on the feedback from each of the plurality of macros to determine locations for the movable pins.

7 Claims, 6 Drawing Sheets

(56) References Cited

U.S. PATENT DOCUMENTS

| | | | | |
|---|---|---|---|---|
| 2012/0036491 A1* | 2/2012 | Ramji | .................. | G06F 17/5072 716/122 |
| 2012/0054699 A1* | 3/2012 | Cho | .................... | G06F 17/5068 716/102 |
| 2012/0233577 A1* | 9/2012 | Chandra | ............. | G06F 17/5072 716/105 |
| 2014/0189630 A1* | 7/2014 | Viswanath | .......... | G06F 17/5072 716/129 |

OTHER PUBLICATIONS

Christopher J. Berry et al., "Constraint-Driven Pin Optimization for Hierarchical Design Convergence", U.S. Appl. No. 14/936,920, filed Nov. 10, 2015.

List of IBM Patents or Patent Applications Treated as Related; (Appendix P), Filed Oct. 9, 2015; 2 pages.

Christopher J. Berry et al., "Hierarchical Wire-Pin Co-Optimization", U.S. Appl. No. 14/794,871, filed Jul. 9, 2015.

* cited by examiner

HIERARCHICAL WIRE-PIN CO-OPTIMIZATION

DOMESTIC BENEFIT/NATIONAL STAGE INFORMATION

This application is a continuation of U.S. application Ser. No. 14/794,871 filed Jul. 9, 2015, the disclosure of which is incorporated herein by reference in its entirety.

BACKGROUND

The present invention relates to chip design, and more specifically, to hierarchical wire-pin co-optimization.

Part of the process of obtaining a physical implementation of a chip design involves pin placement. Pin (or wire-pin) placement is part of the physical synthesis step in chip design. A chip is typically organized hierarchically. Each portion of the design hierarchy (referred to as a block or unit) includes a number of sub-blocks (referred to as macros). Each unit and each macro include a number of layers of metal. Each of the layers includes wires, and the pins are interfaces for wires to go between macros. In addition, macro-level pins are assigned locations defined by three perpendicular axes since the pins may be allocated on different levels or metal layers. Currently, each macro is assigned pin locations for its interior pins by a unit-level controller. These assignments stem from a chip-level controller that assigns pin locations to each unit.

SUMMARY

According to an embodiment, a method of performing physical synthesis in a chip design process using hierarchical wire-pin co-optimization includes providing, using a processor, boundary conditions to each of a plurality of macros of the chip design from a unit level controller, the boundary conditions including initial pin locations and an indication of which of the pins are movable pins for each of the plurality of macros; performing macro-level physical synthesis at each of the plurality of macros; providing feedback to the unit level controller based on the macro-level physical synthesis performed at each of the plurality of macros, the feedback including a proposed new location for the movable pins of each of the plurality of blocks; and performing hierarchical co-optimization at the unit level controller based on the feedback from each of the plurality of macros to determine locations for the movable pins.

According to another embodiment, a system to perform physical synthesis using hierarchical wire-pin co-optimization in a chip design process includes a memory device storing computer readable instructions; and a processor executing the computer readable instructions to provide boundary conditions corresponding to each of a plurality of macros of the chip design, the boundary conditions including initial pin locations and an indication of which of the pins are movable pins for each of the plurality of macros, perform macro-level physical synthesis at each of the plurality of macros, provide feedback based on the macro-level physical synthesis performed at each of the plurality of macros, the feedback including proposed new locations for the movable pins of each of the plurality of macros, and perform the hierarchical co-optimization based on the feedback to determine locations for the movable pins.

According to yet another embodiment, a computer program product to perform physical synthesis using hierarchical wire-pin co-optimization in a chip design process includes a computer readable storage medium having program code embodied therewith. The program code is executable by a processor to perform a method including providing boundary conditions to each of a plurality of macros of the chip design, the boundary conditions including initial pin locations and an indication of which of the pins are movable pins for each of the plurality of macros; performing macro-level physical synthesis at each of the plurality of macros; providing feedback based on the macro-level physical synthesis performed at each of the plurality of macros, the feedback including a proposed new location for the movable pins of each of the plurality of macros; and performing hierarchical co-optimization based on the feedback from each of the plurality of macros to determine locations for the movable pins.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, pins of each macro (macro-level pins) are currently assigned at a unit level. Further, according to the hierarchical organization of the chip, the unit level assignments come from the chip level. The primary focus at the unit level is on wiring all the macros in such a way that timing requirements are met. However, the timing requirements may be met with inefficient wiring that creates other inefficiencies (e.g., higher area usage than necessary due to scenic paths for wiring). Embodiments of the systems and methods discussed herein relate to hierarchical wire-pin co-optimization or a feedback mechanism for macro-level movement of pins with the unit level controller controlling the ultimate pin placement. Along with pins that cannot be moved, the unit level controller indicates any movable pins to each macro. At the macro level, a tradeoff may be made between thicker wires at higher metal layers that may be routed over longer distances and thinner wires at lower metal layers that reduce wire congestion at the higher metal layers. The macro-level decision on the placement of these movable pins is fed back to the unit level controller for the final decision on pin placement. While the detailed discussion below pertains to feedback from the macros to the unit level controller for each unit, the description applies, as well, to feedback from the units to the chip-level controller. As such, the pin placement according to embodiments detailed herein is referred to as hierarchical co-optimization.

Figure 1:
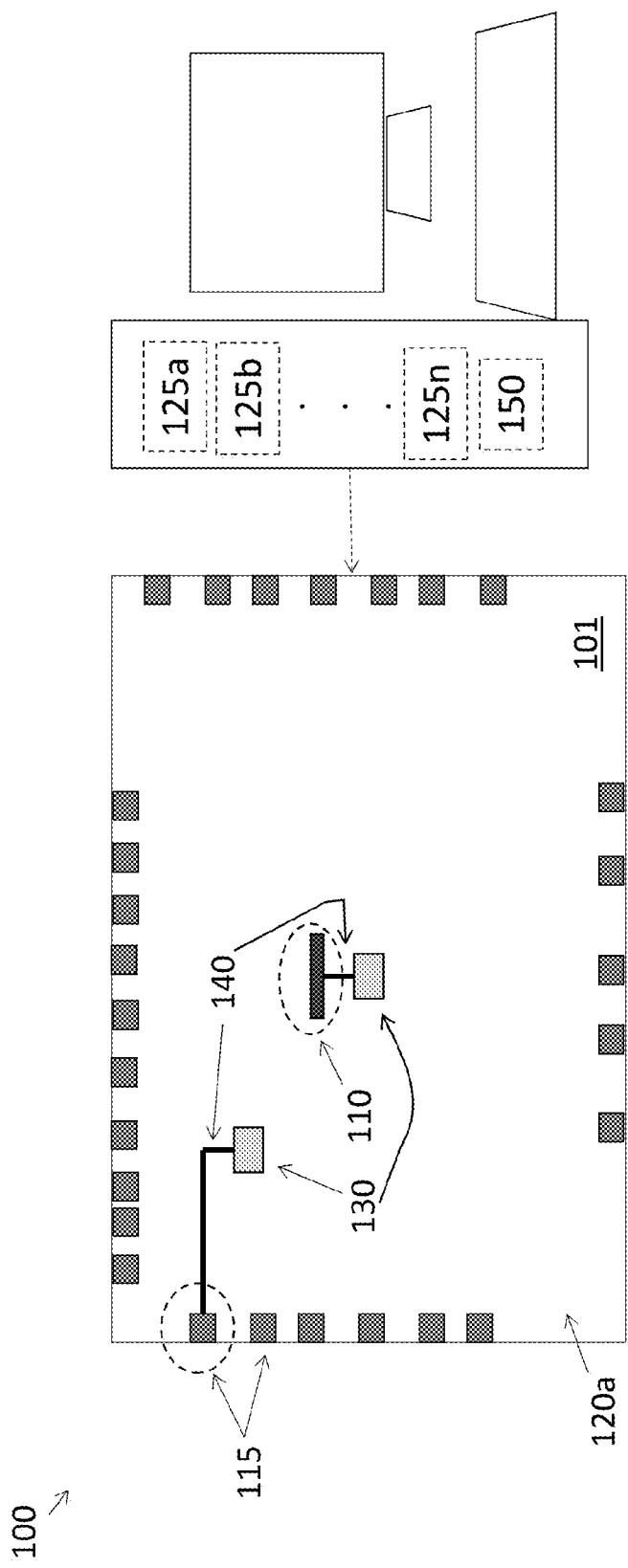
FIG. 1 is a perspective top-down view of a unit within a chip designed according to embodiments discussed herein.

FIG. 1 is a perspective top-down view of a unit 101 within a chip 100 designed according to embodiments discussed herein. From the perspective of FIG. 1, only the top metal layer 120a is visible with other metal layers 120 being below the top metal layer 120a. As noted above, chip 100 design may be subdivided into a number of blocks or units 101, and unit design may be subdivided into a number of macros 250 (FIG. 2), each of which includes a number of metal layers 120. An interior pin 110 is shown connected to a component 130 (e.g., macro 250, device, logic gate), and a boundary pin 115 is shown connected to another component 130. As noted above, the wires 140 shown in this top metal layer 120a are likely to be thicker than those in lower metal layers 120. The wires 140 go from a source component 130 to a sink component 130. A unit level controller 150 controls the placement of all the pins in all of the macros 250 to meet timing and boundary constraints. According to embodiments detailed below, the unit level controller 150 is part of a hierarchical process of co-optimization of pin placement. The unit level controller 150 receives feedback from macro-level controllers 125. While the macro-level controllers 125 and unit level controller 150 are shown separately in FIG. 1, the physical synthesis at the macro level and the unit level may be performed by the same one or more processors using instructions from one or more memory devices.

Figure 2:
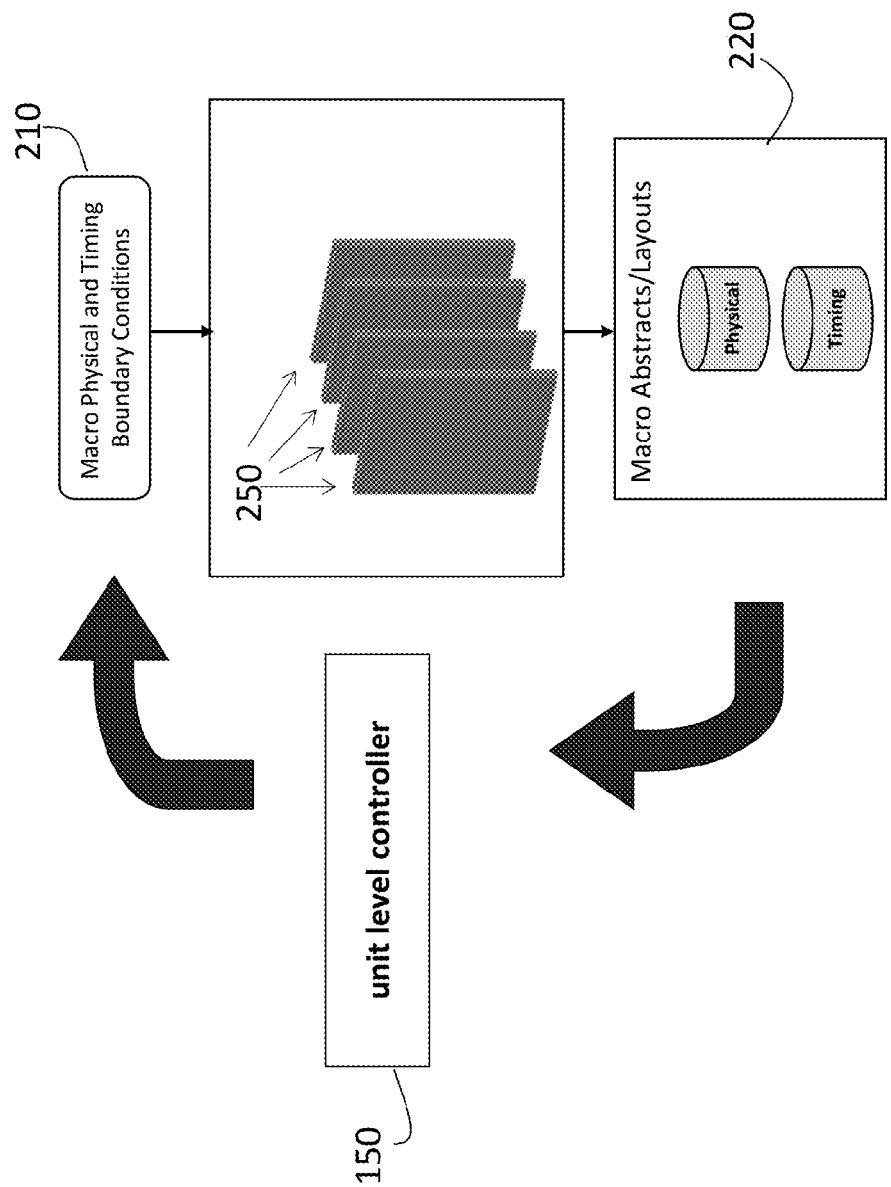
FIG. 2 is a flow diagram of the co-optimization according to an embodiment.

FIG. 2 is a flow diagram of the co-optimization according to an embodiment. FIG. 2 is a high-level view of the hierarchical co-optimization process. At block 210, macro physical and timing boundary conditions are provided by the unit level controller 150 and input to each of the macros 250. As further discussed below, the macro physical and timing boundary conditions include an indication of which interior pins 110, 115 of each of the macros 250 are movable. Based on a physical synthesis process at the macro-level (by the macro-level controller 125 of each of the macros 250) that is further detailed with reference to FIGS. 3 and 4, each of the macros 250 outputs proposed locations for the movable pins 110, 115 and timing outputs (slack criticality score discussed below) at block 220. These outputs may be stored in addition to being provided to the unit level controller 150. The databases indicated at block 220 also store the initial macro-level pin locations for each macro 250 (suggested at block 210 by the unit level controller 150). This feedback is provided for co-optimization purposes to the unit level controller 150. The unit level controller 150, which has a higher level view of the unit 101 design than any macro 250, determines which proposed moved locations for the pins 110, 115 to retain, which to discard, and which to modify, as further discussed below. The unit level controller 150 considers the effects of the proposals by each of the macros 250 on the overall timing and on other design constraints. The unit level controller 150 may initiate the feedback loop by providing initial macro-level physical (e.g., pin 110, 115 locations) and timing boundary conditions at block 210 again as many times as needed to optimize the design. During each iteration, the unit level controller 150 may indicate fewer pins 110, 115 as movable, for example, as the design converges.

Figure 3:
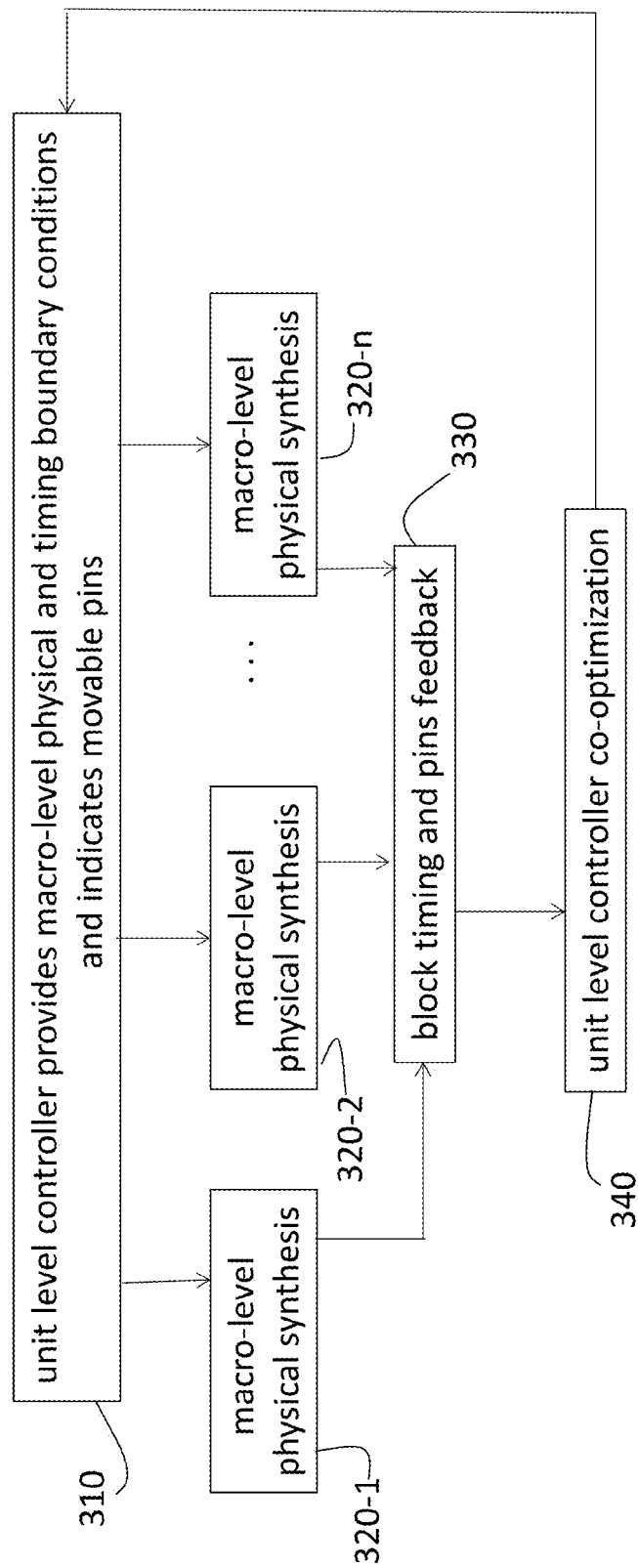
FIG. 3 is a process flow of a method of performing the hierarchical co-optimization of pin placement according to an embodiment of the invention.

FIG. 3 is a process flow of a method of performing the hierarchical co-optimization of pin placement according to an embodiment of the invention. At block 310, the unit level controller 150 provides macro-level physical and timing boundary conditions and indicates movable pins 110, 115 to each of the blocks 250. Each of the n macros 250 then performs macro-level physical synthesis at blocks 320-1 through 320-n. The processes involved in macro-level physical synthesis are further detailed with reference to FIG. 4. The macros 250 provide block timing and pins feedback at block 330 (which relates to block 220 of the flow overview at FIG. 2). The unit level controller 150 co-optimization at block 340 includes accepting none, some, or all of the feedback regarding locations of the movable pins 110 by the different macros 250. The considerations of the unit level controller 150 in this regard are further discussed below. The unit-level controller 150 may restart the processes at block 310 any number of times to converge on a final pin placement for the unit 101.

As noted above, one level of hierarchical design involves each of the unit level controllers 150 getting feedback from their respective macros 250 and performing co-optimization. Once the unit level controllers 150 complete their co-optimization, the next higher level of hierarchical design may be performed based on the unit level controllers 150 providing feedback on pin placement to a controller of the chip 100. As also noted, the various controllers may be implemented with the same one or more processors. During each iteration, different pins 110, 115 may be indicated as movable. According to alternate embodiments, the iterations may be done at different stages of the design, as well, with more or fewer pins 110, 115 indicated as movable depending on the design stage. For example, in earlier stages of the design, more pins 110, 115 may be indicated as movable, but, as aspects of the unit 101 and chip 100 design start being locked down as timing constraints are met and other design constraints are realized, fewer pins 110, 115 may be movable. In some stages, some macros 250 may have pins 110, 115 that are indicated as movable while other macros 250 may not have any movable pins 110, 115.

Some of the additional considerations of the unit level controller 150 in determining whether or not to accept a proposed move of a pin 110, 115 or how much to modify a proposed location are discussed below. One of the primary considerations of the unit level controller 150 is the effect on timing of any pin 110, 115 movements. A wire-code lookup table or other reference may be used by the unit level controller 150 to determine the unit length delay (e.g., in picoseconds (ps)) associated with each metal layer and wire code. This information is used by the unit level controller 150 to calculate the unit path delay impact or change in timing based on the proposed movement of pins 110, 115 as:

$$(\Delta x_A + \Delta y_A)(t_{unit} - t_{macroA}) + (t_{int\_g\_new} - t_{int\_g\_old}) + (\Delta x_B + \Delta y_B)(t_{unit} - t_{macroB}) + t\_adjust_{macroA} + t\_adjust_{macroB} \quad [EQ. 1]$$

In EQ. 1, macroA and macroB represent the source and sink between which the wire 140 traverses. In EQ. 1, $\Delta x$ and $\Delta y$ are the x and y coordinate changes for the source and sink macro pin locations; $t_{unit}$, $t_{macroA}$, and $t_{macroB}$ are the delay of unit length (from the lookup table, for example) for the metal layer 120 and wire code combination assigned by the unit level controller 150 and from physical synthesis in macro A and macro B, respectively; $t_{intg}$ is the integration delay (buffer and interconnect delay); and t_adjust is the macro internal buffering adjustment. That is, based on the macro pin location computed by the unit level controller 150, additional buffers may be needed on the lower layer wires within the macro 250 to satisfy electrical (slew) requirements. This buffer delay is captured through t_adjust. The unit level controller 150 may use a threshold on the result of EQ. 1 to determine whether pin 110, 115 locations proposed by the macros 250 at the macro-level may be retained.

Figure 4:
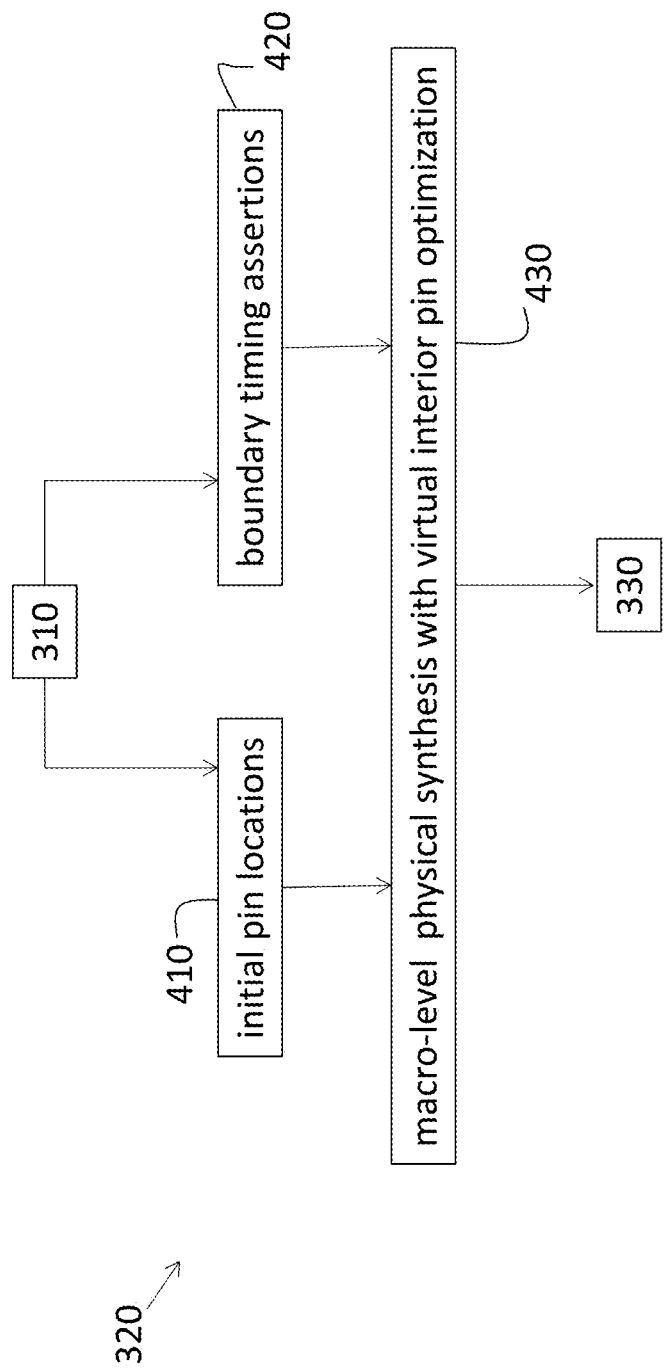
FIG. 4 details the macro-level physical synthesis process shown at FIG. 3 according to an embodiment of the hierarchical co-optimization.

FIG. 4 details the macro-level physical synthesis process shown at block 320 of FIG. 3 according to an embodiment of the hierarchical co-optimization. As FIG. 3 indicates, the processes shown in FIG. 4 are implemented by each macro 250 of each unit 101 of the chip 100. As noted above, some macros 250 may not have any pins 110, 115 indicated as being movable. Initial pin 110, 115 locations are input at block 410, and boundary timing assertions are input at block 420. These inputs are provided by the unit level controller 150 at block 310 (comparable to block 110 of the general flow in FIG. 1). The macro-level physical synthesis with virtual pin optimization, at block 430, refers to each macro 250 idealizing and de-weighting boundary networks connected to candidate (movable) interior pins 110. Proposed locations for movable pins 110, 115 are determined by the physical synthesis process (within each macro 250) such that the boundary path delay to (and from) the pins 110, 115 is minimized. De-weighting and idealizing boundary networks adjusts the cost function used to determine the proposed locations for the pins 110, 115. For example, the influence of the original pin 110, 115 location on the proposed pin 110, 115 location may be increased or decreased.

Figure 5:
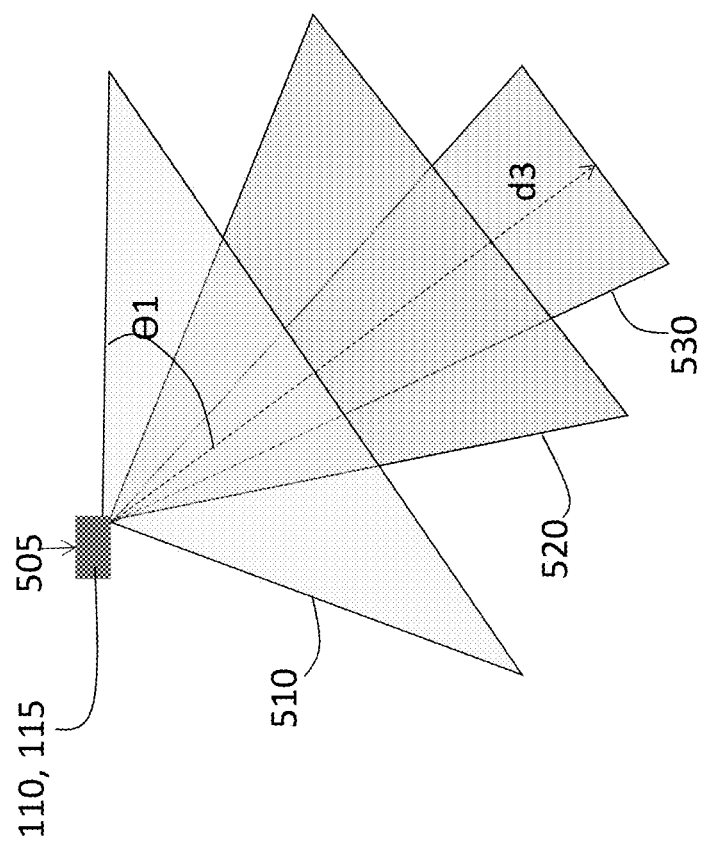
FIG. 5 illustrates determination of a movable area for a movable pin at the unit level controller level according to an embodiment.
Figure 6:
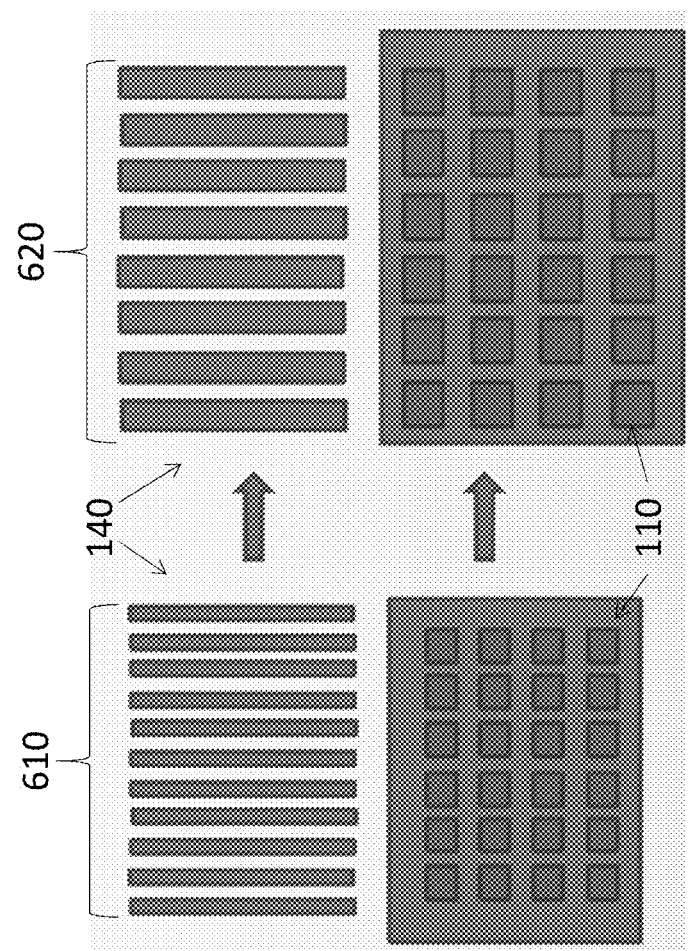
FIG. 6 illustrates consideration of logical relationships of pins at the unit level controller level according to an embodiment.

FIGS. 5 and 6 illustrate considerations for pin 110, 115 movement at the unit level controller 150 according to embodiments. The relative slack criticality score provided by the macros 250 in association with pins 110, 115 proposed for movement is a factor in the determination, at the unit 101 level, of the ultimate pin 110, 115 location (at the current hierarchical level). The relative slack criticality score provided with a proposed pin 110, 115 location gives an indication of where and by how much the initial pin 110, 115 location may be moved by the unit level controller 150 based on the feedback from a macro 250. The allowable distance and angle $\{d,\Theta\}$ from the original pin 110, 115 location is based on the relative slack criticality score at the source and sink locations. That is, the connection between the source and sink must meet timing criticality. When this wire or connection exceeds the timing requirement, it is referred to as slack (negative slack indicates a failure to meet timing requirements). The relative slack criticality score refers to the relative slack of the given connection as compared to other connections with associated pins 110, 115. A pin 110, 115 associated with a relative slack criticality score that is higher (more critical) than the relative slack criticality score of another pin 110, 115 will have less freedom of movement by the unit level controller 150.

FIG. 5 illustrates three different scenarios for pin 110, 115 movement according to embodiments of the invention. While alternate embodiments may involve other shapes, triangles are used to indicate the area within which an initial pin location 505 may be moved. The first scenario relates to a low relative slack criticality score. In this case, the triangle 510, which has the highest angle $\theta 1$ and the shortest distance (triangle height) indicates the area within which the pin 110, 115 may be moved from location 505. The second scenario relates to a medium relative slack criticality score. In this case, the triangle 520 indicates the area within which the pin 110, 115 may be moved from the location 505. The third scenario relates to a high relative slack criticality score. In this case, triangle 530, which has the smallest angle and the greatest distance (triangle height) d3, indicates the area within which the pin 110, 115 may be moved from location 505.

FIG. 6 illustrates consideration of logical relationships of pins 110, 115 at the unit level controller 150 level according to an embodiment. A bus signal construct is illustrated in FIG. 6. A set of wires 140 and associated pins 110, 115, collectively 610, corresponding with bits of a bus are shown, and a proposed set of wires 140 and associated pins 110, collectively 620, corresponding with bits of the bus are also shown. In the example of FIG. 6, the proposed move is to a higher metal layer 120 such that the wires 140 in 620 are wider than the wires 140 in 610. When a multi-bit signal is used as in the example of FIG. 6, all the pins 110, 115 associated with the bits have a logical relationship, and the pin 110, 115 placement must take into account that the timing associated with all the pins 110, 115 for all the bits of the bus must be the same. This bus signal construct affects the freedom of movement of the pins 110, 115 associated with bits of the bus. The consideration may be at the macro-level, at the unit level controller 150, or a combination of the two. For example, the unit level controller 150 may reject a proposed movement of pins 110, 115 (e.g., 610 to 620) from a macro 250 when that movement does not take into consideration the logical relationship among the pins 110, 115 (the bus signal construct). Specifically, the pin 110, 115 width and spacing must be co-optimized for timing and reliability in consideration of all the other pins 110 associated with the bus.

Technical effects and benefits include improved pin placement based on consideration at the macro level with constraints maintained at the unit level and then, in a next hierarchical stage, consideration at the unit level with constraints maintained at the chip level The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of performing physical synthesis in a chip design process using hierarchical wire-pin co-optimization, the method comprising:
providing, using a processor, boundary conditions to each of a plurality of macros of the chip design from a unit level controller, the plurality of macros being part of a unit and the boundary conditions provided to each of the plurality of macros including initial pin locations and an indication of which of the pins are movable pins for each of the plurality of macros;
performing macro-level physical synthesis at each of the plurality of macros of the unit;
providing feedback to the unit level controller at a hierarchical level of the unit corresponding with the plurality of macros based on the macro-level physical synthesis performed at each of the plurality of macros, the feedback including a proposed new location for the movable pins of each of the plurality of blocks;
performing pin placement at the unit level controller at the hierarchical level of the unit based on the proposed new locations in the feedback from each of the plurality of macros to determine locations for the movable pins; and
iteratively performing the providing the boundary conditions, the performing the macro-level physical synthesis, the providing the feedback, and the performing the pin placement at the hierarchical level of the unit, and indicating different ones of the pins as the movable pins at each iteration, wherein the performing the pin placement is performed in a physical implementation of the chip design in an integrated circuit following the last iteration.

2. The method according to claim 1, wherein the performing the pin placement at the hierarchical level of the unit includes determining a degree of freedom of movement of the moveable pins based on relative slack criticality of timing slack at a source and sink associated with each of the movable pins.

3. The method according to claim 1, wherein the performing the pin placement at the hierarchical level of the unit includes verifying that a width and spacing of a set of the movable pins corresponding with a multi-bit bus facilitate achieving a same timing for each of the set of the movable pins corresponding with the multi-bit bus.

4. The method according to claim 1, wherein the performing the pin placement at the hierarchical level of the unit includes determining a change in timing resulting from the proposed new location for each of the movable pins.

5. The method according to claim 4, wherein the determining the change in timing is according to:

$$(\Delta x_A + \Delta y_A)(t_{unit} - t_{macroA}) + (t_{int\_g\_new} - t_{int\_g\_old}) + (\Delta x_B + \Delta y_B)(t_{unit} - t_{macroB}) + t\_adjust_{macroA} + t\_adjust_{macroB}, \text{ and}$$

macro A and macro B represent a source and sink between which a wire traverses through the movable pin, $\Delta x$ and $\Delta y$ are an x and y coordinate shift between the corresponding initial pin location and the proposed new location, $t_{unit}$, $t_{macroA}$, and $t_{macroB}$ are a delay associated with a metal layer and wire code combination assigned by the unit level controller and from the performing the macro-level physical synthesis in the macro A and the macro B, respectively; $t_{intg}$ is integration delay; and t_adjust is a macro internal buffering adjustment.

6. The method according to claim 1, further comprising performing the providing the boundary conditions, the performing the macro-level physical synthesis, the providing the feedback, and the performing the pin placement at the hierarchical level of the unit at different stages of the chip design process.

7. The method according to claim 1, further comprising performing the pin placement at the hierarchical level of the unit at a chip level based on feedback from each of a plurality of the unit level controllers.

* * * * *